March 15, 1938.  F. L. WILSON  2,111,161
SURGEON'S TOWEL CLIP
Filed May 17, 1937

Inventor
FREDRIC L. WILSON
By *Hiram A. Sturges*
Attorney

Patented Mar. 15, 1938

2,111,161

UNITED STATES PATENT OFFICE 2,111,161

SURGEON'S TOWEL CLIP

Fredric L. Wilson, Stuart, Nebr.

Application May 17, 1937, Serial No. 143,030

6 Claims. (Cl. 128—321)

This invention relates to surgical instruments, and specifically to an improved towel clip.

In the practice of surgery, and particularly for major operations it is necessary to protect the skin edges from contagion after incisions have been made by binding the edges of the skin with towels. The towel clips heretofore used for covering and securing the towels to the edges of the incised skin consist of instruments or clips having the form, approximately of scissors, provided with curved needle-like claws at their distal ends for gripping and penetrating the parts and maintaining the towels in contact with the skin edges.

The principal object of this invention is to provide a surgeon's towel clip of such construction that a greater area of the skin edges will be protected than heretofore, one of the advantages being that a lesser number of instruments will be required for a single operation, the time required for an operation will be lessened and the skin edges will be uniformly and effectively covered and protected.

The invention consists of the new and useful construction, combination and arrangement of parts as described herein and claimed, and as illustrated in the accompanying drawing, it being understood that changes may be made in form, size, proportions and minor details, said changes being within the scope of the invention as claimed.

Figure 1:
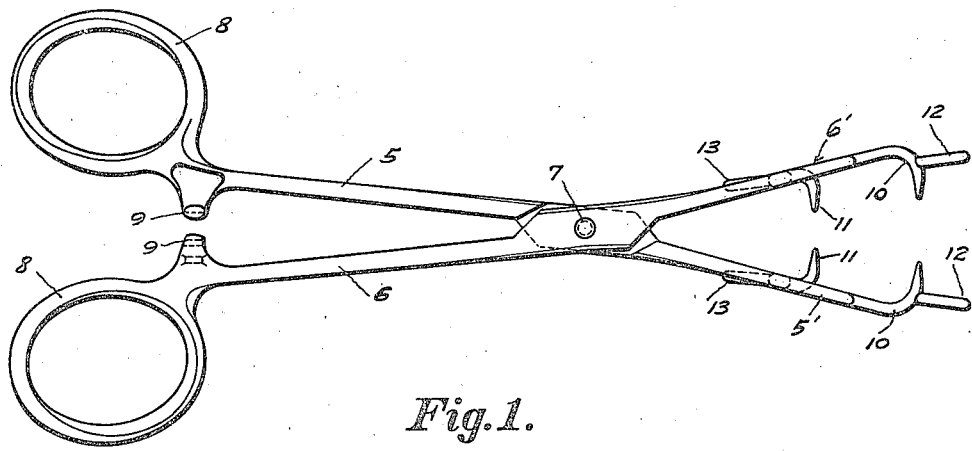
Figure 2:
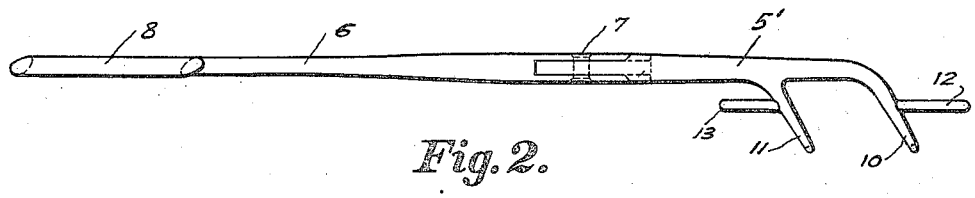

In the drawing, Fig. 1 is a top plan view of the surgeon's towel clip, and Fig. 2 is a side view of the same.

Figure 3:
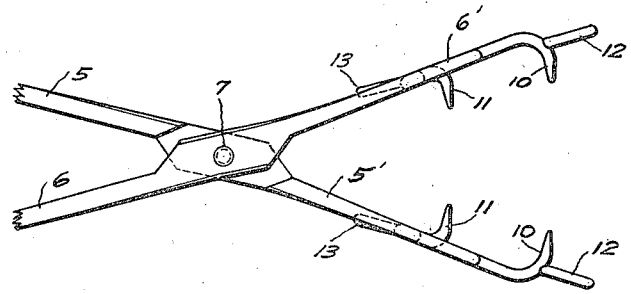
Figure 4:
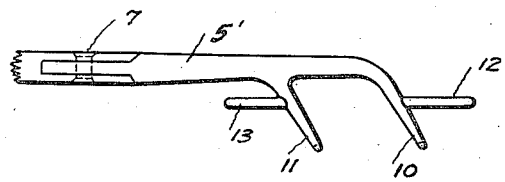

Fig. 3 is a detail relating to Fig. 1 showing the gripping end-portions of the lever-arms, and Fig. 4 is a side view of the same.

Referring now to the drawing for a more particular description, the towel clip consists of a pair of lever-arms indicated at 5 and 6, pivotally connected between their ends at 7, and provided with handles 8, also provided with co-operating locking-members 9 so that when the handles are moved toward each other to closed position the lever-arms will remain relatively stationary until the members 9 are relatively detached. The parts thus mentioned have been in general use in the construction of various kinds of tools and instruments. In the present instance the invention relates to new and useful parts which are provided for the distal or front end-portions of said lever-arms.

The distal end-portions of the lever-arms are indicated at 5' and 6'. These end-portions are approximately rectilinear in form, and all parts of the instrument are preferably of attenuated form so that excessive weight will be avoided.

In order that the objects of the invention, first mentioned, may be attained, the end-portions 5' and 6' of the lever-arms are provided at their ends with a pair of curved prongs 10, and at 11 is indicated a second pair of prongs provided for the end-portions of said lever-arms, said last named pair of prongs being disposed between the prongs 10 and the pivotal connection 7 of said lever-arms.

It will be noted that the prongs of each pair are of curved form and extend downwardly from the end-portions 5' and 6' and having terminals which project toward each other, the terminal part of each prong being of tapered form and sharp, so that they will penetrate the skin and layers of the towel without undue resistance during operation.

The parts are of such proportion that, during operation, the prongs 10 and 11 will coincidently engage the skin of the patient when the handles 8 are moved to closed position.

In operation, it will be understood that the towel is folded so that it covers the edge of the skin, at the incision, and by use of the instrument, the prongs, moving toward each other, will pass through the two layers of the towel and skin for covering and protecting the edge of the skin, and the instrument is not removed from its gripped position until a later stage of the surgical operation.

Numeral 12 indicates forwardly projecting pressure-bars which are provided for the prongs 10, and at 13 are indicated rearwardly projecting pressure-bars provided for the prongs 11, and it will be noted that the pressure-bars are disposed approximately parallel with the end-portions 5' and 6' with which they move. Also each pressure-bar is disposed in spaced relation and below an end-portion, as clearly shown in the drawing, and therefore during operation these pressure-bars will press the towel against the surface of the skin and the towel will have a uniform pressure.

It will be appreciated that a large area of the towel will be secured to the skin-edge by use of the towel clip as described and therefore a lesser number of them will be required for an operation.

While I have shown two prongs for each end-portion 5' and 6' I do not wish to be understood as limiting myself to the exact number of prongs, and I consider the use of presser-bars to be a matter of importance for uniformly maintaining the towels in contact with the skin edge.

I claim as my invention,—

1. A surgeon's towel clip comprising a pair of interlocking lever-arms pivotally connected between their ends and having front-end portions provided at longitudinal intervals with downwardly and laterally projecting prongs, each prong being provided with a pressure-bar disposed approximately parallel with a lever-arm.

2. A surgeon's towel clip comprising a pair of lever-arms pivotally connected between their ends and having approximately rectilinear front end-portions provided at longitudinal intervals with prongs projecting downwardly and laterally therefrom, each prong being provided with a pressure-bar disposed approximately parallel with and in spaced relation relative to said end-portion of a lever-arm.

3. A surgeon's towel clip comprising a pair of self-locking lever-arms pivotally connected between their ends and having their distal end-portions provided with a pair of curved prongs with sharp terminals and provided between said prongs and pivotal connection with a pair of secondary prongs with sharp terminals, each prong of the first named pair being provided with a forwardly projecting pressure-bar and each secondary prong being provided with a rearwardly projecting pressure-bar.

4. A surgeon's towel clip comprising a pair of interlocking lever-arms pivotally connected between their ends and having approximately rectilinear distal end-portions provided with a pair of curved prongs with sharp terminals and provided between said prongs and pivotal connection with a pair of secondary prongs with sharp terminals, each prong of the first named pair being provided with a pressure-bar projecting forwardly therefrom approximately parallel with a distal end-portion of one lever-arm and each secondary prong being provided with a pressure-bar projecting rearwardly therefrom approximately parallel with the distal end-portion of the other lever-arm of said pair.

5. A surgeon's towel clip comprising a pair of pivotally connected lever-arms provided at their distal ends with a pair of curved prongs and a pair of secondary curved prongs rearwardly of the first named prongs, each prong of the first named pair being provided with a forwardly projecting pressure-bar and each secondary prong being provided with a rearwardly projecting pressure-bar, each pressure-bar being disposed in spaced relation from and approximately parallel with a lever-arm.

6. A surgeon's towel clip comprising a pair of pivotally connected lever-arms provided with a pair of curved prongs with sharp terminals and a secondary pair of curved prongs with sharp terminals, each prong being provided with a pressure-bar disposed in spaced relation from and approximately parallel with a lever-arm.

FREDRIC L. WILSON.